United States Patent [19]
Wilde

[11] Patent Number: 5,940,090
[45] Date of Patent: Aug. 17, 1999

[54] METHOD AND APPARATUS FOR INTERNALLY CACHING THE MINIMUM AND MAXIMUM XY PIXEL ADDRESS VALUES IN A GRAPHICS SUBSYSTEM

[75] Inventor: Daniel P. Wilde, Cedar Park, Tex.

[73] Assignee: Cirrus Logic, Inc., Fremont, Calif.

[21] Appl. No.: 08/852,468

[22] Filed: May 7, 1997

[51] Int. Cl.[6] .................................................... G06F 12/06
[52] U.S. Cl. ..................... 345/517; 345/501; 345/521; 345/441
[58] Field of Search .................................. 345/418–422, 345/429–443, 475, 112–115, 118, 121, 501–506, 520–526, 507, 509, 515, 191, 516, 517, 508, 511

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,056,044 | 10/1991 | Frederickson et al. | 345/516 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,544,306 | 8/1996 | Deering et al. | 345/507 |
| 5,748,202 | 5/1998 | Nakatsuka et al. | 345/514 |
| 5,798,763 | 8/1998 | Larson et al. | 345/423 |
| 5,801,711 | 9/1998 | Koss et al. | 345/441 |
| 5,808,617 | 9/1998 | Kenworthy et al. | 345/421 |

FOREIGN PATENT DOCUMENTS

WO 96/36011 11/1996 WIPO ............................ G06T 3/00

OTHER PUBLICATIONS

Based on US App 08/438,860 filed May 5, 1995.

*Primary Examiner*—U. Chauhan
*Attorney, Agent, or Firm*—Winstead, Sechrest & Minick; Steven A. Shaw

[57] ABSTRACT

A graphics system includes a graphics processor for rendering graphics primitives with a list of display parameters. A host processor generates a display list which includes a XY address for rendering the graphics primitives. A graphics processor which includes an address tracking logic circuit tracks the rendering primitive to determine the minimum and maximum XY addresses of the rendered primitive. By tracking of the XY address, the graphics processor is able to internally cache only modified portions of the rendered primitive thereby improving the graphics processor's access cycle to the modified data. Accordingly, the graphics processor's memory bandwidth requirements is reduced.

31 Claims, 10 Drawing Sheets

5,940,090

METHOD AND APPARATUS FOR INTERNALLY CACHING THE MINIMUM AND MAXIMUM XY PIXEL ADDRESS VALUES IN A GRAPHICS SUBSYSTEM

FIELD OF INVENTION

The present invention relates generally to a graphics system for personal computers. More particularly, the present invention relates to a method and apparatus for internally caching XY pixel addresses in a graphics processor.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the graphics software receives information for drawing objects on a computer screen, calculates certain basic parameters associated with the objects and provides this to the graphics processor in the form of a "display list" of parameters.

A graphics controller then uses the display list values in generating the graphics objects to be displayed. A graphics processor may use interpolation techniques where the fundamental information for the object to be drawn comprises a series of initial and incremental parameters or values. The graphics processor loads or otherwise receives the initial parameters for the pixels to be drawn, interpolate the object by incrementing the parameters until the object is completely drawn.

FIG. 2 is a block diagram illustrating a typical prior art computer system. The computer system shown in FIG. 2 includes a host CPU 110, host memory 120 and a system bus 105 connected to the host CPU 110 to interface to external peripheral devices. The system bus 105 comprises a series of signals which may be connected to peripherals through a connector or may be connected to the peripherals directly if mounted to the host CPU's 110 logic board.

A graphics processor 130 is also shown coupled to the system bus 105. The graphics processor 130 is typically programmed to render graphics primitives by using a mapped set of registers resident in the host CPU's 110 address range.

A set of registers is mapped to the smallest addressable bit location by the host CPU 110. Each graphics subsystem register when selected by the host CPU is given a value from the host data bus and the register is selected when the host CPU initiates a write cycle with an address which matches a bit pattern for the respective register. Each register has a particular function which may or may not affect the operation of the graphics subsystem 130.

Still referring to FIG. 2, the graphics processor renders polygons such as that shown in FIG. 1 by reading and writing pixel parameter values from the frame buffer 140 before such polygons are rendered on the display unit 150.

The graphics processor 130 may also include an internal memory, such as dynamic random access memory (DRAM) or a static random access memory (SRAM) to allow the internal storage of polygon information from the frame buffer 150. In such a graphics system setup, the graphics processor 130 is able to implement XY address caches from the polygons being rendered by fetching an area from the frame buffer 140 large enough to hold portions of the polygon to be rendered.

The graphics processor 130 subsequently stores the entire fetched area from the frame buffer 150 without taking into account what portions of the fetched data actually changed.

Prior art graphics processor which implement internal XY address caching are not able to take advantage of the performance benefits offered by address caching. Consequently, many of the prior graphics processor require extra memory either from the frame buffer or the system memory to handle some of the sophisticated multimedia graphics applications programs available today.

Even though the prior art graphics processor could take advantage of the caching of X and Y pixel addresses to perform fast accesses to the internal cache for the X and Y addresses from the internal memory location when Z buffering or alpha blending, the XY cache must first be fetched from the frame buffer. The XY area fetched must therefore include the entire area to be rendered.

However, due to most prior art Z buffering techniques causing portions of the pixels being rendered to be hidden (i.e., not drawn); it is possible to reduce the area to be stored through XY minimum/maximum address tracking.

Thus, a method of reducing the memory bandwidth of the graphics processor while rendering graphics primitives such as polygons within the graphics subsystem while maintaining the processing speed of CPU is needed. The present invention provides the advantageous functionality of a graphics processor capable of internally caching polygon data without the redundancy of the prior art method of pixel address fetches and caching while reducing the memory store.

SUMMARY OF THE INVENTION

This need and others are substantially met through provision of a method and a system for tracking the minimum and maximum X and Y pixel addresses for graphics polygon being rendered to an internal cache in a graphics processor. In accordance with the preferred embodiment, the present invention monitors the modified X and Y pixel addresses of a polygon rendered or to be rendered from a frame buffer or other memory and stores the relevant modified information internally in the graphics processor.

Preferably, a graphics processor couples to a system bus for receiving display instructions from a host processor providing display parameters of the primitives to be drawn. Based on the depth value (Z) comparison of the pixel to be rendered, the graphics processor dynamically selects only the necessary X and Y address positions of the pixels to use in rendering the polygon thus permitting the graphics processor to access the cached data in a single clock cycle.

The graphics processor preferably includes an internal static random access memory for caching the relative X and Y pixel addresses of an X and Y address space in the frame buffer. The graphics processor preferably also includes a 3D engine which receives the X and Y pixel data and generates parameter values to enable the rendering of a polygon.

The graphics processor also includes a tracking logic unit for tracking the minimum and maximum X and Y pixel addresses to determine the minimum XY space that must be stored back to the frame buffer for a polygon being rendered.

In the preferred embodiment, the tracking logic receives the relative X and Y pixel addresses for the first pixel of the polygon being rendered from the rendering engine. The tracking logic subsequently compares any incoming X and Y pixel address with the previous min/max X and Y pixel addresses to determine whether the new X and Y addresses represents either a new maximum or minimum address.

An address recalculation unit is coupled to the tracking logic unit to recalculate the maximum and minimum X and Y pixel address positions in the frame buffer as the graphics processor continues to render polygons. The address recalculation logic receives an X pixel start address of a polygon being rendered and the minimum X pixel address, adds the two addresses together to generate a new X pixel start address. Additionally, the recalculation logic recalculates the X and Y extent address to describe the new minimum XY area to be stored.

Accordingly, the graphics processor of the preferred embodiment is able to determine which portions of the frame buffer to internally cache in order to speed up X and Y pixel address fetches to render a polygon in a single clock cycle.

BRIEF DESCRIPTION OF THE DRAWINGS

A better understanding of the present invention can be obtained when the following detailed description of the preferred embodiment is considered in conjunction with the following drawings in which.

DETAIL DESCRIPTION OF THE PRESENT INVENTION

A method and apparatus for providing a means of internally storing XY pixel addresses in a graphics device is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances, well know methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, signals capable of being stored, transferred, combined, compared, and otherwise manipulated in a computer system. For reasons of convenience and with reference to common usage, these signals are referred to as bits, values, or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
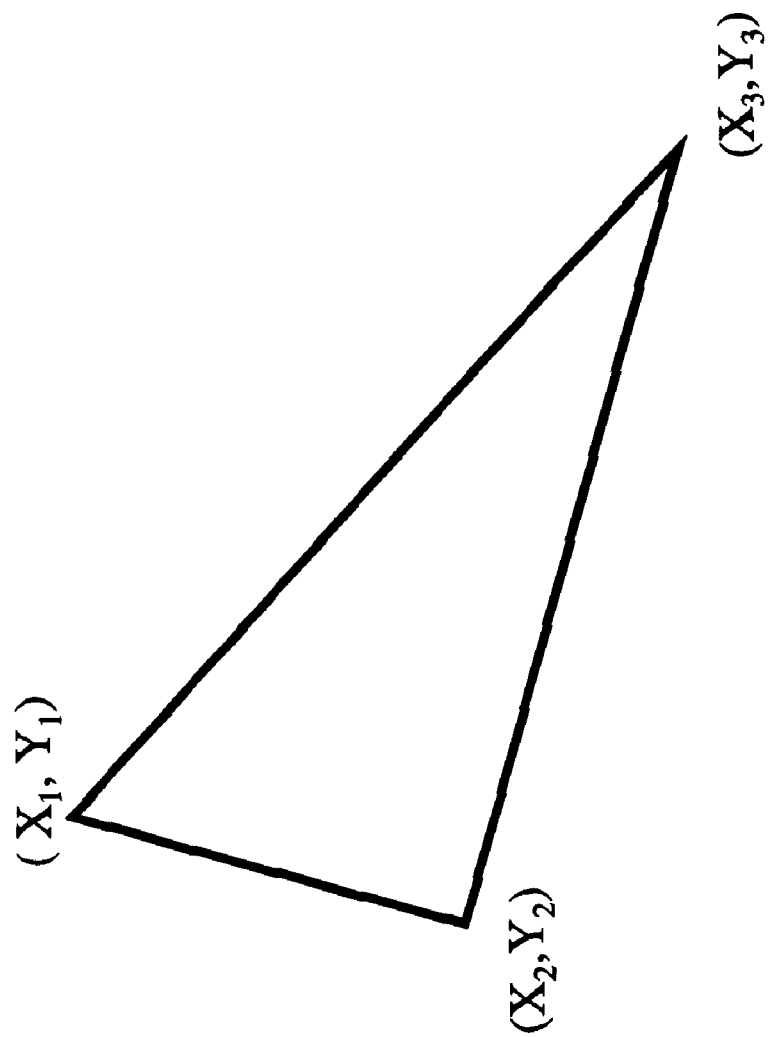
FIG. 1 is a diagram of an exemplary depiction of a polygon to be drawn to illustrate the main slope technique for rendering 3D primitives.
Figure 2:
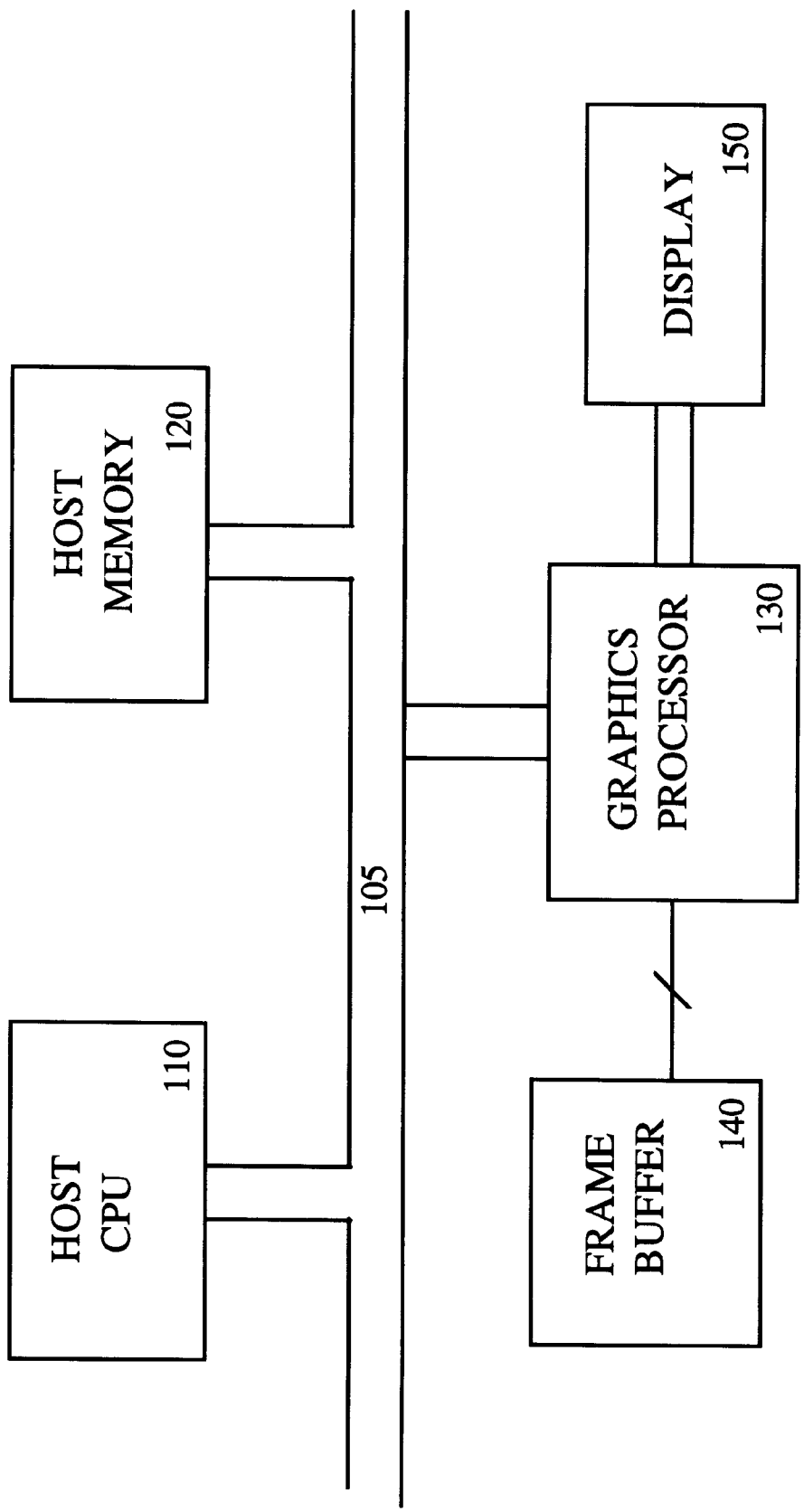
FIG. 2 is a simplified block diagram of a prior art computer system including a host central processor, a graphics processor coupled to a system bus and a system memory for storing display parameters.
Figure 3:
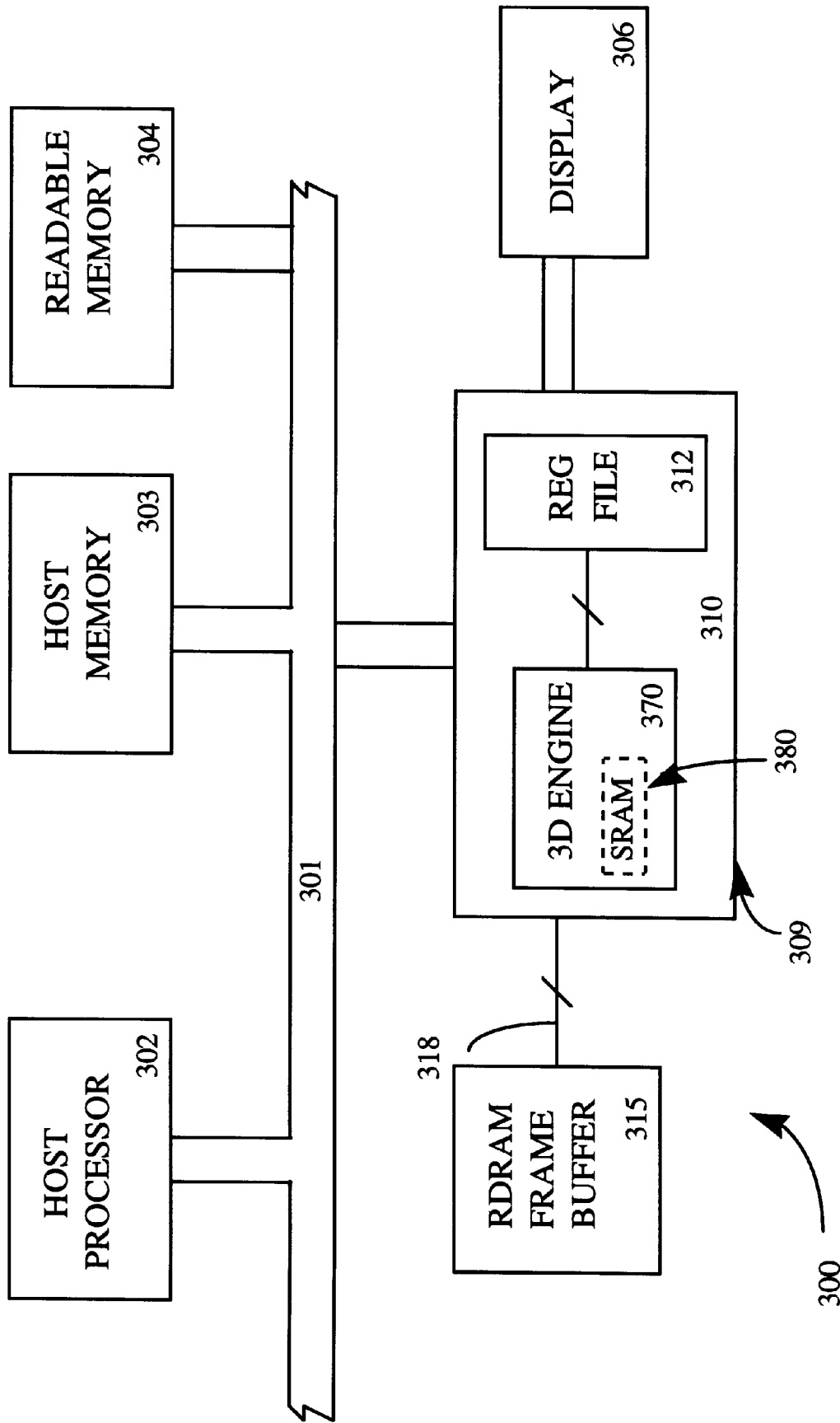
FIG. 3 is a simplified block diagram of a computer system having a graphics subsystem, in accordance to the teachings of the present invention.

With reference to FIG. 3, a block diagram is shown of a host computer system 300 used by the preferred embodiment of the present invention. In general, host computer system 300 comprises a bus 301 for communicating data and instructions, a host processor (CPU) 302 coupled to bus 301 for processing data and instructions, a computer readable memory unit 303 coupled to bus 301 for storing data and instructions from the host processor 302, a computer readable data storage device 304 coupled to bus 301 for storing data and display device 306 coupled to bus 301 for displaying information to the computer user. The display device 306 utilized with the computer system 300 of the present invention can be a liquid crystal device, cathode ray tube, or other display device suitable for creating graphics images and alphanumeric characters recognizable to the computer user.

The host system 300 provides data and control signals via bus 301 to a graphics hardware subsystem 309. The graphics hardware subsystem 309 includes a graphics processor 310 which executes a series of display instructions found within a display list. The graphics processor 310 supplies data and control signals to a frame buffer which refreshes the display device for rendering images on display device.

It should be understood that the particular embodiment shown in FIG. 3 is only one of many possible implementations of a graphics system for use in a computer system. FIG. 3 is simplified for purposes of clarity so that many components and control signals are omitted which are not necessary to understand the present invention.

In the preferred embodiment, the graphics processor 310 provides hardware support for 2D and 3D graphics, and for text and windowing operations of a computer system. The graphics processor 310 transfers digital data from the system memory 304 or host processor 302, and processes data for storage in the RDRAM 315 ultimately for display on the display unit 306.

The host processor 302 and system memory 304 both preferably communicate with the graphics processor 310 via the system bus 301. The system bus 301 preferably is the peripheral component interconnect (PCI) bus.

Still referring to FIG. 3, the graphics processor 310 couples to the system bus 301. In accordance with the preferred embodiment, the graphics processor 310 preferably includes bus mastering capabilities, thus permitting graphics processor 310 to bus master the system bus 301. Graphics processor 310 also couples to a display unit and a RDRAM 315.

In the preferred embodiment, the frame buffer comprises a bank of RDRAM chips, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 306.

The graphics hardware subsystem 309 hosts an array of volatile memory units referred to as register file 312. The register file 312 holds working information of the graphics device. The register file also stores information and commands needed for operation of the graphics device 309.

The display unit 306 may be any suitable type of display device, such as a cathode ray tube (CRT) for desktop, workstation or server applications, a liquid crystal display (LCD), a retina simulation device such as the virtual retinal display (VRD) manufactured by Microvision or any other suitable display device for a personal computer.

The RDRAM frame buffer 315 provides a performance improvement by permitting faster access to display list instructions and pixel data, compared to accessing data stored in the main memory 304 of the host computer system 300. The graphics processor 310 communicates to the RDRAM buffer 315 through address data and control lines, collectively referred to as a RBUS 318.

Figure 4:
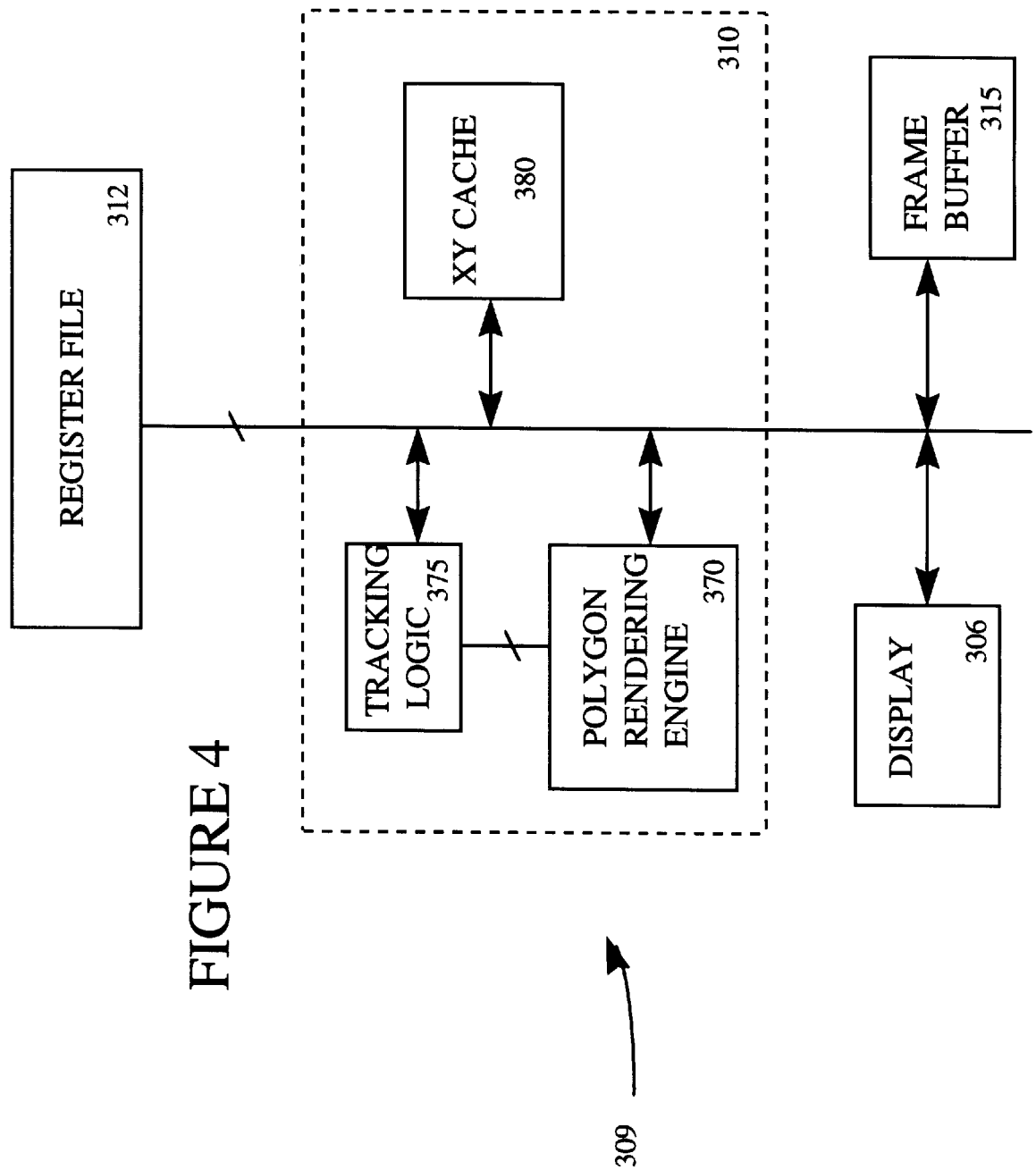
FIG. 4 is a simplified block diagram showing in detail the graphics subsystem of FIG. 3.

Referring now to FIG. 4, the graphics hardware subsystem 309 preferably includes a register file 312, a graphics processor 310 and a frame buffer 315. Generally the register files 312 comprises a plurality of registers for storing the display list information.

The graphics processor 310 also includes a polygon rendering engine 370, an SRAM XY cache 380 and tracking logic unit 375. Other logic may also be provided as part of the graphics processor, but are left out here so as not to obscure the present invention.

The polygon rendering engine 370, (also referred to as a polyengine or rendering engine), preferably receives vector data or parameters from the register file (shown in FIG. 3), for points, lines, polygons and other geometric quantities and then calculate or otherwise interpolate the pixel positions, color intensity, depth and transparency or alpha-blending for the various geometric quantities and characteristics.

SRAM XY cache 380 is coupled to the polygon rendering engine 370 to temporarily store the XY values of polygons to be rendered. By caching the XY values of polygons, the graphics processor of the present invention is able to allow high speed (single clock) accesses of the XY data thereby reducing the number of accesses the graphics processor has to make to the frame buffer.

Tracking logic 375 is coupled to the polygon rendering engine 370 to track the XY min/max values of data stored in cache 380. A detailed description of the operation of the tracking logic 375, the XY cache 380 and the polygon rendering engine 370 according to the teaching of the present invention is given in FIG. 6 below.

Figure 5:
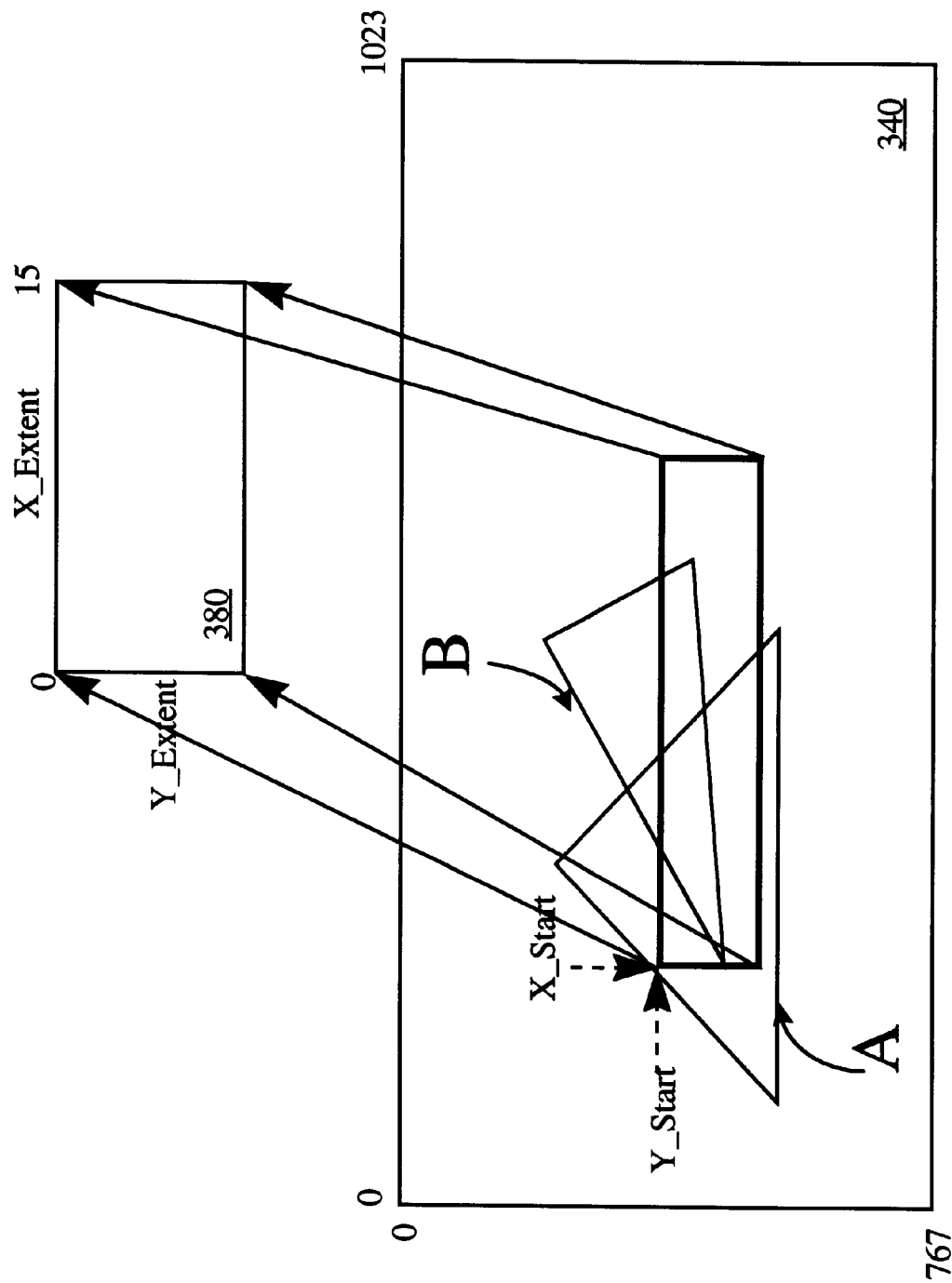
FIG. 5 is a diagram of an exemplary depiction of the XY pixel address fetch for a polygon being rendered from the frame buffer space to the graphics subsystem's internal SRAM cache in accordance with the principles of the present invention.

FIG. 5 is a simplified block diagram of an exemplary embodiment of the fetch concept of the present invention. As shown in FIG. 5, Frame buffer 340 stores the entire address parameter values of the polygons (e.g. A & B) to be rendered by the polygon rendering engine 370 of FIG. 4. A fetch logic included in the rendering engine 370 fetches XY addresses from the XY memory space of the frame buffer 340 into the internal XY cache 380.

In the representation shown in FIG. 5, X_Start and Y_Start define the upper left corner of the XY cache respectively as to where it fits in the internal XY cache 380. The fetched polygon (i.e. XY cache) is then rendered by the polygon engine with the relative addresses (e.g., X-:0–15 and Y-:0–7). X_Extent and Y_Extent respectively define the width and height of the XY cache.

Once the XY space required for polygon "B" is cached in the XY cache 380, the graphics processor 310 then begins tracking the minimum and maximum relative XY pixel addresses of the polygon being rendered.

Figure 6:
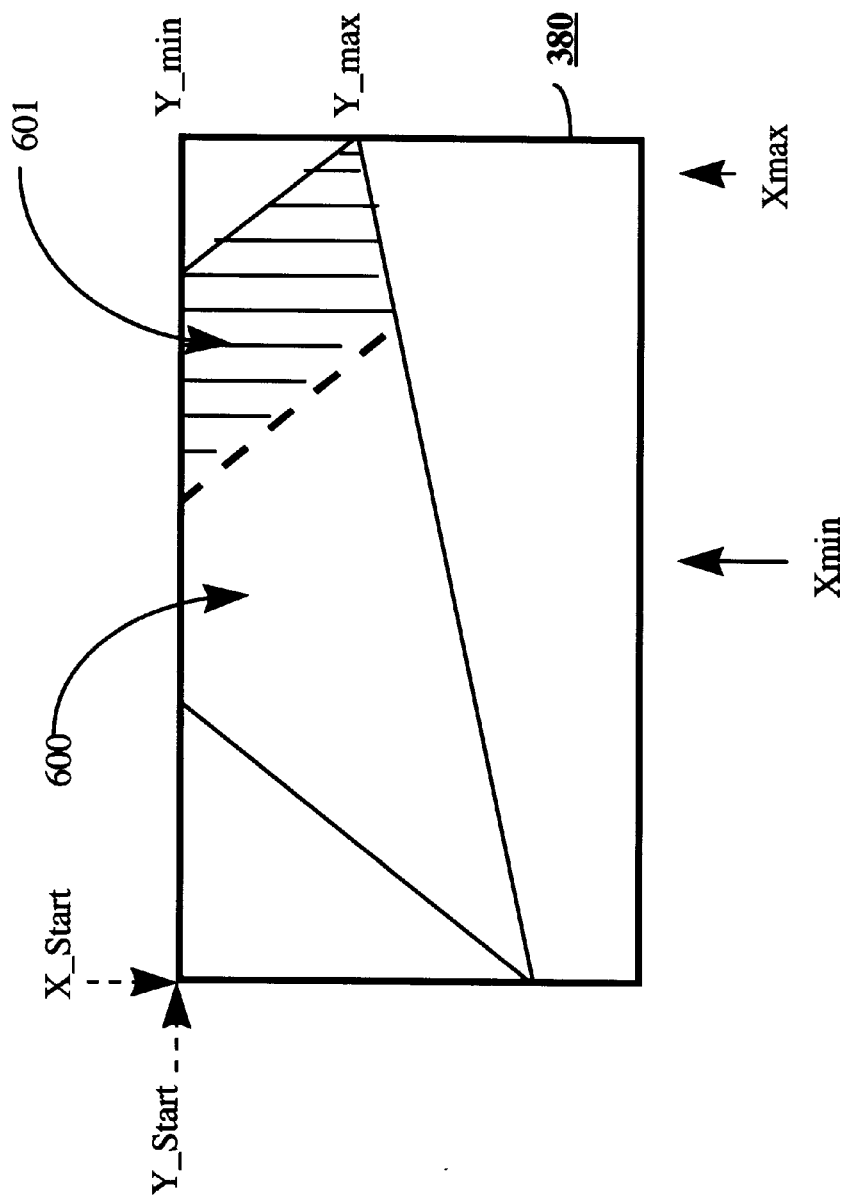
FIG. 6 is an exemplary depiction of a rendered polygon with modified X and Y pixel addresses which have to be cached into the graphics processor's internal cache.

Referring now to FIG. 6 which is a simplified diagram of a polygon rendered in the frame buffer memory space. To draw a graphics primitive, for example the polygon shown in FIG. 6, in the present invention, the polygon engine would have calculated the minimum XY cache area to fit the portion of polygon B to be rendered, then fetched that area into the internal cache buffers (both the color and Z buffers). Rendered polygon B while checking for Z depth, stipple and XY clipping to determine if pixels of polygon B are to be rendered. In the polygon shown in FIG. 6, the pixels in area 600 are the pixels of polygon B that were masked (not rendered).

The pixels in area 601 are the pixels which have been modified after the Z comparison and by other masking operations such as stippling and clipping. Only the area which contains the modified pixels must be stored. In the present invention, the fetched area may be about 128 bytes and the stored area may be about 60 bytes. Thus by internally tracking XY min/max the modified pixels to the polygon, less than 50% of the entire XY cache is stored. This in turn reduces the amount of memory bandwidth required by the polygon rendering engine to render the polygon.

Figure 7:
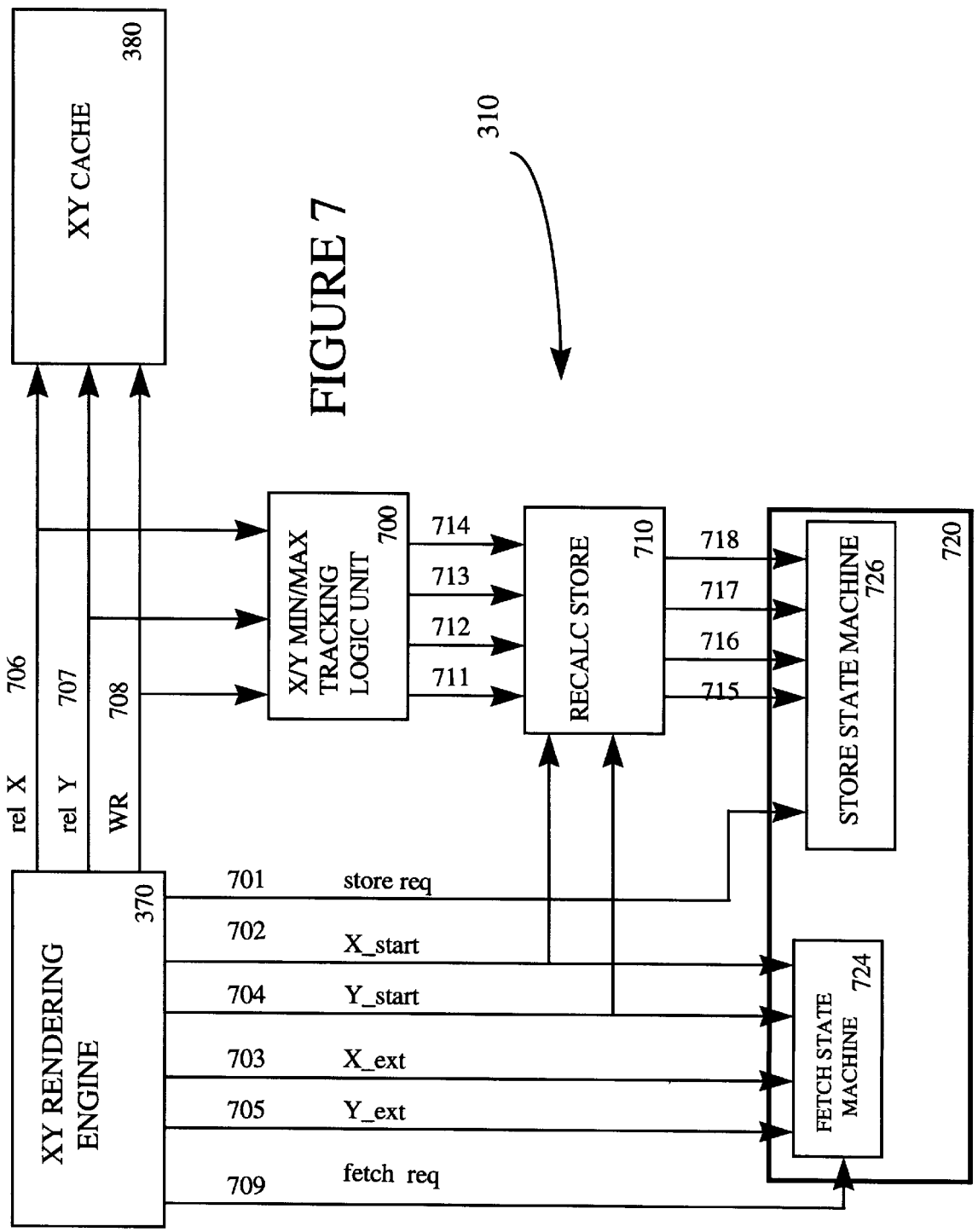
FIG. 7 is a simplified block diagram showing in detail the graphics processor of FIG. 4.

FIG. 7 is a block diagram showing in some detail the graphics processor of the preferred embodiment of the present invention illustrated in FIG. 4.

As shown in FIG. 7, the XY rendering engine 370 receives the polygon address parameters from the host processor. The XY rendering engine 370 then generates a fetch request via request lines 709 to fetch a block of data from the frame buffer for storage in the internal XY cache 380. The data requested and fetched from the frame buffer comprises the Y_extent data via Y_extent lines 705, X_Extent data via X_Extent lines 703, Y_Start data via Y_Start lines 704 and X_Start data via X_Start lines 702. The rendering engine 370 then renders the fetched data from the frame buffer to the XY cache 380 by generating the relative XY addresses of the frame buffer memory via lines rel_X 706 and rel_Y 707. XY rendering engine 370 further asserts write lines 708 to write the fetched frame buffer memory to XY cache 380.

The XY cache 380 is a small SRAM capable of translating the XY addresses generated by the rendering engine into a linear storage location temporarily storing that information.

In the preferred embodiment of the present invention, the relative XY addresses generated by the rendering engine 370 are also written to the tracking logic unit 700 each time the write lines 708 are asserted.

Still referring to FIG. 7, the tracking logic unit takes the relative XY pixel addresses to XY cache and compares against the previous XY min/max relative pixel address stored. The tracking logic unit allows the rendering engine to only stored the modified pixels of a polygon rendered. The XY min/max address calculated by the tracking logic unit are provided to recalc store unit 710 via lines 711 through 714.

The recalc store unit 710 receives the Y_Start and X_Start address values from the rendering engine 370 each time the rendering engine initiates a store request to the frame buffer. Additionally, the recalc store unit 710 receives the X_min/X_max and the Y_min/Y_max addresses of a cached frame buffer memory.

The XY memory controller 720 interfaces the rendering engine 370 to the frame buffer. The XY memory controller 720 comprises a fetch state machine 724 and a store state machine 726. The rendering engine 370 requests a store via lines 701 to the store state machine 726.

The recalc store unit 710 generates the new X_Start and Y_Start addresses as well as the X_extent and Y_extent addresses of each new request to store state machine 726 in XY memory controller 720. X_Start and the Y_Start addresses are sent to store state machine 726 of XY memory controller 720 via lines 715 and 717 respectfully. X_extent and Y_extect addresses are sent to store state machine 726 of XY memory controller 720 via lines 716 and 718 respectfully.

It will be obvious to one skilled in the art that XY memory controller 720 may include other logic units which are not shown in FIG. 7 in order not to obscure the jest of the present invention.

Figure 8A:
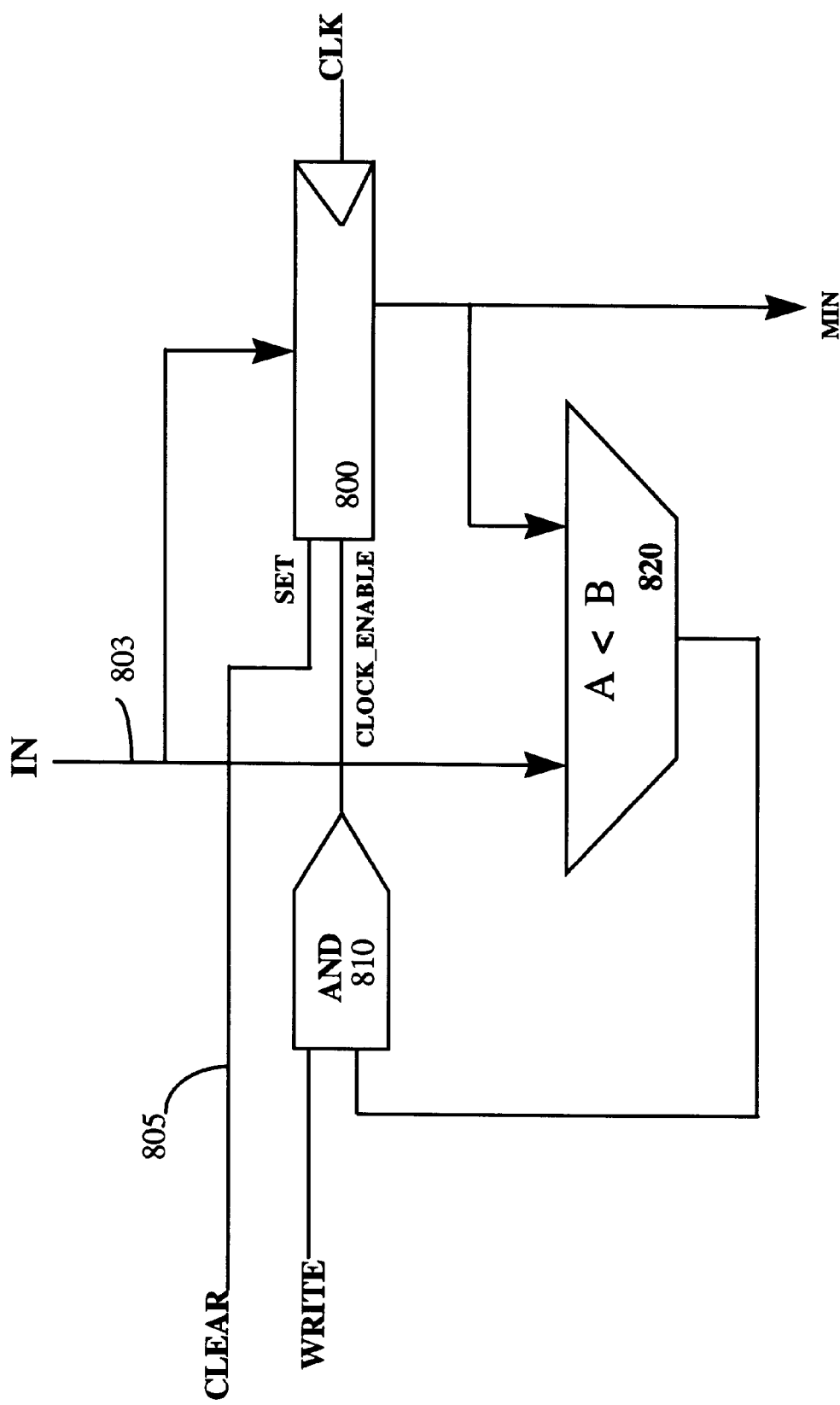
FIG. 8A is a schematic representation of the X and Y minimum pixel address tracking of the tracking logic unit of FIG. 7.

Referring now to FIG. 8A is a schematic drawing of the tracking logic unit shown in FIG. 7. A load register 800 has data inputs for receiving the current minimum XY address values via lines 803. Load register 800 also has inputs for receiving a clear pulse signal via signal lines 805 to set the load register prior to the first pixel rendered to the XY cache. Load register 800 also receives a clock signal at one of its inputs to clock the data rates for the pixels loaded into the register. A clock enable signal is coupled to one of the inputs of load register 800 to indicate when the load register should latch the input data. In the preferred embodiment of the present invention, data is clock at approximately 80 MHZ. The output of load register 800 is coupled to one of the inputs (e.g., the B input) of comparator 820.

Still referring to FIG. 8A, AND gate 810 receives at one of its inputs the write enable signal which when asserted indicates a valid pixel address to be compared. The output of AND gate 810 is coupled to the clock enable of the load register, the other input of AND gate 810 is the output of comparator 820. If the compare is true and write enable is active the new XY is saved in the storage register 800.

The comparator 820 receives as one of its input the current minimum XY value of the current pixel to be rendered, the other input of comparator 820 is the minimum of all XY. The incoming address value of the current pixel being rendered is compared with stored minimum. If the new address value is less than the previously stored address value, a compare true signal will activate the clock enable signal to the register 800 via AND gate 810.

For example, when rendering engine 370 of FIG. 7 initiates a fetch request to the frame buffer, the rendering engine 370 generates a pulse on clear to set the minimum to maximum XY number. The first pixel rendered ( or when the write pulse is active high) establishes a new minimum address value. Every other pixel's x position is then compared to the last minimum address value stored in the load register to determine if it is new. If the incoming minimum XY address is new, it is stored in the register 800.

Figure 8B:
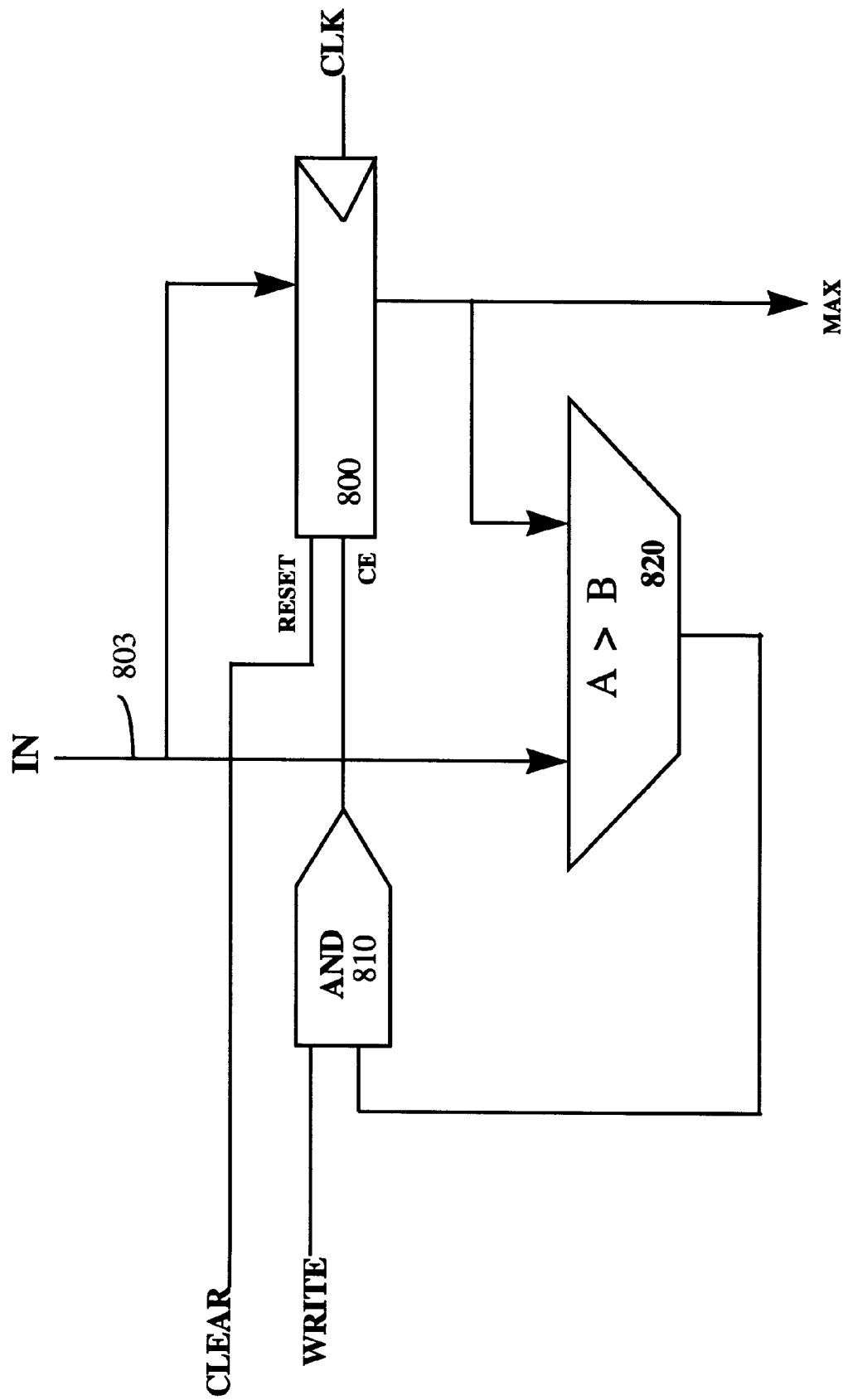
FIG. 8B is a schematic diagram of the X and Y maximum pixel address tracking of the tracking logic of FIG. 7.

Referring to FIG. 8B which is a schematical representation of the XY maximum address tracking logic in accordance with the present invention and wherein reference designators corresponding to features first described with reference to FIG. 8A are similarly referenced beginning with the register 800. As shown in FIG. 8B, the incoming maximum XY address is compared with the currently stored XY maximum address to determine which address is greater in value. If the incoming address is higher than the currently stored maximum XY address value, it is stored in register 800.

Figure 9:
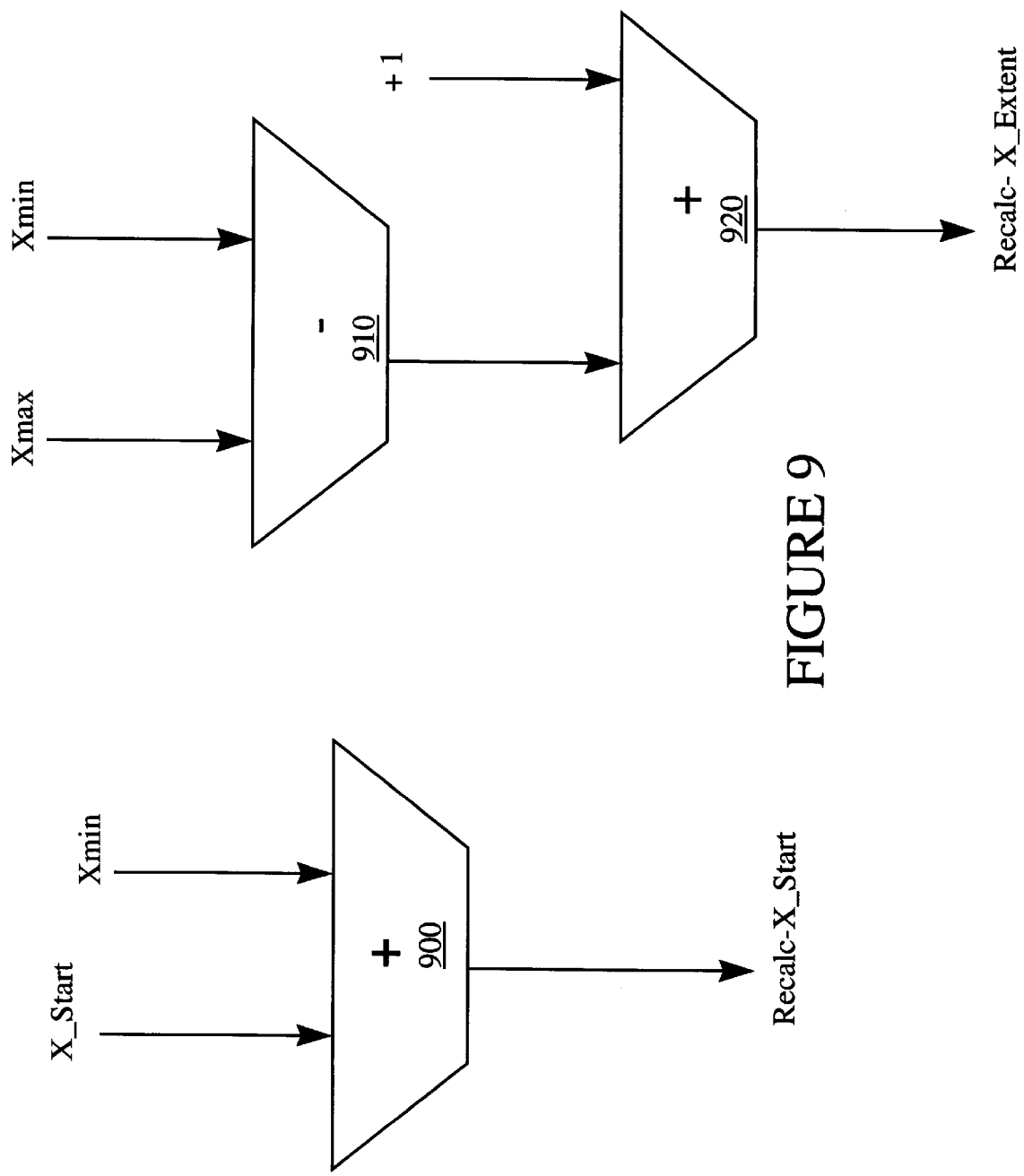
FIG. 9 is a schematic of the recalculation logic unit of the graphics processor of FIG. 7.

Reference is now made to FIG. 9 which is a schematical representation of the recalculation unit of FIG. 7. s shown in FIG. 9, the recalculation unit comprises of a plurality of adders. Adder 900 is disposed within the recalculation unit to receive the X_start and X_min addresses. Address adder 900 generates the recalculated X_start address by adding the values of the original X_start address and the X_min address. To calculate the new X_extent address, address adder 910 subtracts the X_min address from the X_max address and adds one to the result in address adder 920 to generate the new X_extent address.

To generate the recalculated Y_start and Y_extent addresses, the recalculation unit uses a similar recalculation logic as provided for the X address recalculation.

While the invention has been shown and described with reference to preferred embodiments thereof, it will be understood that various substitutions and changes in form and detail may be made by those skilled in the art without departing from the spirit and scope of the invention. Accordingly the method and apparatus of tracking minimum and maximum XY address herein disclosed are to be merely considered as illustrative, and the scope of the invention is to be limited only as specified in the claims. It is intended that the following claims be interpreted to embrace all such modification and variations.

What is claimed is:

1. A system for caching graphics primitives into an internal storage space to provide a fast retrieval operation to render the graphics primitive, wherein the minimum and maximum addresses responsive to the width and length values of the primitive is tracked to determine when to overwrite the internal storage unit, the system comprising:

a system bus for communicating data and instructions and generating address write cycles;

a host processor coupled to the system bus for generating graphics primitive address requests to the system bus;

a system memory coupled to the system bus for storing a list of display parameters responsive to the graphics primitives;

a graphic subsystem coupled to the system bus for processing the graphics primitives address request generated by the host processor and rendering the graphics primitives;

an internal storage unit disposed within the graphic subsystem for temporarily storing XY pixel addresses cached in the graphic subsystem; and a memory interface control unit coupled to the graphic subsystem for asserting control signals to allow the graphic subsystem to interpolate a polygon from a main storage unit and the internal storage unit, wherein the graphic subsystem includes means to track minimum and maximum XY addresses of a modified portion of the polygon, and wherein the modified portion of the polygon is stored in the internal storage unit in response to the maximum and minimum XY addresses.

2. The system of claim 1, wherein the main storage unit is a frame buffer.

3. The system of claim 2, wherein the addresses stored in the internal storage unit are relative addresses of the addresses stored in the main storage unit.

4. The system of claim 3, wherein the internal storage unit is a static random access memory (SRAM) unit.

5. The system of claim 4, wherein the host processor provides signals to initiate a fetch request operation to fetch the addresses corresponding to the polygon being rendered from the frame buffer.

6. The system of claim 5, wherein the graphic subsystem includes means to generate XY addresses in the main storage unit in response to the maximum and minimum XY addresses.

7. The system of claim 6, wherein the memory controller includes means of determining the storing sequence of the pixel addresses for the polygon stored in the internal storage unit.

8. The system of claim 7, wherein the means for determining the storing sequence is a storing state machine.

9. The system of claim 8 further including a means of tracking fetch sequences of pixel addresses for the polygon being rendered in the graphics subsystem.

10. The system of claim 9, wherein the means of tracking the fetch sequence is a fetch state machine.

11. A graphics processor for tracking the minimum and maximum XY pixel addresses of a polygon being rendered into a temporary storage space, the graphics processor comprising:

a three dimensional (3D) engine for rendering polygons;

a tracking logic unit coupled to the 3D engine for tracking the minimum and maximum XY pixel addresses of a rendered polygon;

an address recalculation unit coupled to the tracking logic unit to receive the minimum and maximum XY pixel addresses of the rendered polygon to generate new address values for the minimum and maximum pixel addresses for modified portions of the rendered polygon; and an internal storage unit coupled to the tracking logic unit to temporarily store portions of the rendered polygon from a main storage unit.

12. The graphics processor of claim 11, wherein the XY pixel addresses respectively represent the width and length values of the polygon being rendered.

13. The graphics processor of claim 12, further including an address generating logic to generate relative XY pixel reference addresses corresponding to portions of the polygon stored in the main storage unit for storage in the temporary storage unit.

14. The graphics processor of claim 13, wherein the temporary storage unit is a static random access memory (SRAM) cache.

15. The graphics processor of claim 14, wherein the SRAM cache is 128 bytes wide.

16. The graphics processor of claim 14, wherein the SRAM cache is 256 bytes wide.

17. The graphics processor of claim 11, wherein the address recalculation unit includes a plurality of address comparators for receiving initial XY addresses and minimum and maximum XY addresses respectively, said address comparators generating a recalculated X or Y start address and an X or Y address extent.

18. The graphics processor of claim 17, wherein the recalculation unit recalculates the X or Y start address by adding the X or Y minimum address to the X or Y start address to move the starting point of an XY block of data in the internal storage unit.

19. The graphics processor of claim 11, wherein the tracking logic unit includes a minimum address tracking logic.

20. The graphics processor of claim 19, wherein the minimum address tracking logic includes a load register for holding current minimum XY addresses in the internal storage unit.

21. The graphics processor of claim 20, wherein the minimum address tracking logic further includes a plurality of AND gates for receiving a write enable signal which when asserted enables the load register to be loaded with the current XY minimum address.

22. The graphics processor of claim 21, wherein the minimum address tracking logic further includes a plurality of address comparators for comparing incoming minimum XY addresses with the XY minimum addresses stored in the load register and, wherein if the incoming minimum address is less than the stored minimum address the load register is overwritten with the incoming minimum address.

23. The graphics processor of claim 11, wherein the tracking logic unit further includes a maximum address tracking logic.

24. The graphics processor of claim 23, wherein the maximum address tracking logic includes a load register for holding current maximum XY addresses in the cache.

25. The graphics processor of claim 23, wherein the maximum address tracking logic further includes a plurality of AND gates for receiving a write enable signal which when asserted enables the load register to be loaded with the current XY maximum address.

26. The graphics processor of claim 23 wherein the maximum address tracking logic includes a plurality of address comparators for comparing incoming maximum XY addresses with stored maximum XY addresses in the load register, and wherein if the incoming maximum address is greater than the stored maximum address the load register is cleared to zero.

27. A method for tracking a minimum and maximum XY addresses of a polygon being rendered, comprising:

generating a list of XY addresses to define the polygon to be tracked:

storing the XY addresses in an internal cache;

tracking the XY addresses in the internal cache when portions of the polygon being rendered are modified; and overwriting the modified portion of the polygon in the internal cache when the maximum and the minimum XY addresses change.

28. The method of claim 27 including the step of comparing a depth value corresponding to the XY addresses of the polygon being rendered with a previous depth value to determine if the polygon should be overwritten.

29. The method of claim 27 further including the step of recalculating new XY address values in the main storage unit of the polygon as portions of the polygon are modified.

30. The method of claim 29, wherein said recalculating step includes the step of comparing incoming XY address values with stored XY address values to determine whether the rendered polygon has been modified.

31. The method of claim 30, wherein the recalculating step further includes the step of comparing an alpha blending parameter corresponding to the XY minimum and maximum XY addresses value with a previous alpha blending parameter of the polygon being rendered to determine whether to overwrite the polygon.

* * * * *